Feb. 25, 1969

C. F. MARTIN 3,429,132

SUBMARINE PIPELINE TRENCHING MACHINE

Filed Nov. 20, 1967

Charles F. Martin
INVENTOR

BY

Hayden Pravel Wilson & Matthews
ATTORNEYS

Feb. 25, 1969

C. F. MARTIN 3,429,132

SUBMARINE PIPELINE TRENCHING MACHINE

Filed Nov. 20, 1967

Charles F. Martin
INVENTOR

BY
Hayden Pravel Wilson & Matthews
ATTORNEYS 3,429,132
SUBMARINE PIPELINE TRENCHING MACHINE
Charles F. Martin, 3515 Bluebonnet,
Houston, Tex. 77025
Continuation-in-part of application Ser. No. 625,201,
Mar. 22, 1967. This application Nov. 20, 1967, Ser.
No. 684,287
U.S. Cl. 61—72.4                                     10 Claims
Int. Cl. B63b 35/04

ABSTRACT OF THE DISCLOSURE

An apparatus for forming a trench for a submarine pipeline wherein two substantially vertically disposed cutting cages are supported from a framework which rides above the pipeline and are rotated in opposite directions for cutting a single trench below the pipeline. A flexible hose is connected between a pump and an inlet tube opening inside each of the cutting cages to remove the cut formation.

Cross reference to related applications

This application is a continuation-in-part of a prior copending application bearing United States application Ser. No. 625,201 filed Mar. 22, 1967, entitled, "Pipeline Trenching Apparatus."

BACKGROUND OF THE INVENTION

Field of the invention

The present invention relates generally to the field of forming trenches for pipelines.

Description of the prior art

The path of a pipeline often takes it across bodies of water in which case it may be necessary to bury the pipe in the bed of the body of water. The pipeline may be buried to retard or prevent damage to the line from marine life and corrosion and to prevent it from becoming an obstacle to surface and subsurface vessels. It may also be necessary in some areas to bury the pipeline to prevent the line from being damaged by anchors, drags, fishing nets, and other similar equipment. In some bodies of water, it is necessary to heavily weight or to bury the pipeline in the water bed to prevent it from being moved about by the current or other water movement.

The prior art includes several types of devices intended to entrench a pipeline in the bed of a body of water. One such device is described in Patent No. 3,004,392 issued to W. D. Symmank. The trencher described in the Symmank patent includes two arms, each of which carries a pair of fan-like horizontally directed cutters. The Symmank apparatus is pulled along the pipeline by a vessel on the surface of the water. Because of this pulling force, the trencher arms of the Symmank apparatus must be securely locked about the pipeline to prevent the apparatus from being pulled away from the pipeline. The horizontal disposition of the circular cutting blades employed in the Symmank trencher produces two cutting paths which result in a double trench with a relatively high tapered ridge therebetween. The pipeline may fall into either of the two trenches or it may come to rest on the center ridge to thereby leave the pipeline undesirably near the surface.

Summary of the invention

The apparatus of the present invention includes a frame from which two arms are pivoted. Each of the arms carries a conical cutting cage, and such cages rotate in opposite directions to maintain the apparatus in an upright position along the pipeline. The two cages are closely spaced from each other to cut a single trench having no appreciable center ridge so that the pipeline is free to rest on the very bottom of the trench to thereby assure proper spacing from the surface of the water bed.

The cuttings which are broken free from the formation of the bed by the rotating cutter cages are ducted away from the trench through flexible hoses which are disposed adjacent the pivotal mounting of the two arms to thereby provide for the pivotal movement of the arms while effectively maintaining sealed ducts for the removal of the cuttings.

Brief description of the drawings

FIG. 4 is a partial cross-section of the apparatus of the present invention taken along the line 4—4 of FIG. 3 with portions of the apparatus being broken away for clarity of illustration.

DESCRIPTION OF THE PREFERRED EMBODIMENT

Construction of the preferred embodiment

Figure 1:
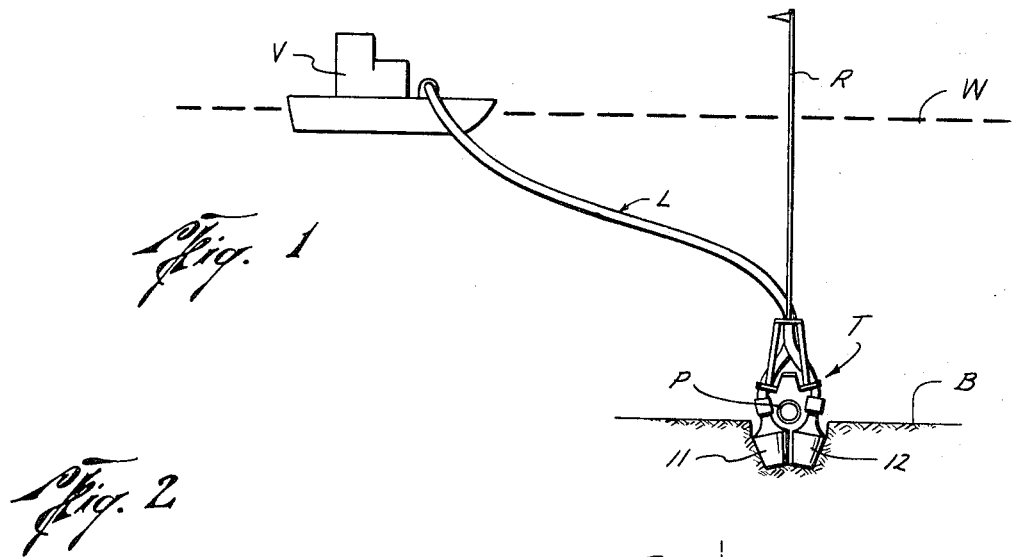
FIG. 1 is a schematic representation of the typical environment of the apparatus of the present invention illustrating the apparatus in position about a pipeline.

As best illustrated schematically in FIG. 1 of the drawings, the submarine pipeline entrenching machine T of the present invention is adapted to straddle a pipeline P with two depending cutter arms 11 and 12 which cut away the formation of a water bed B to form a trench for receiving the pipeline. Various lines indicated generally at L connect the apparatus T with a vessel V on the surface of the water W. The lines L remove cuttings broken away by the cutters 11 and 12 and also supply power for rotating the cutters and for advancing the apparatus T along the pipeline P as the bed B is cut away. A mast rod R or other suitable indicator extends above the surface of the water W from the apparatus T to mark its location.

The apparatus T may best be described in more detail by reference to FIG. 3 of the drawings which illustrates the arms 11 and 12 in position about the pipeline P. The arms are pivotably mounted on an overhead framework indicated generally at 13 by means of hinge pins 14 and 15.

The cylinder portions of two conventional piston-cylinder hydraulic power units 16 and 17 are mounted on the frame 13 by means of a common hinge pin 18 extending through a clevis. Two hinge pins 19 and 20 extend through two separate clevises formed on the arms to connect the piston ends of the units to the arms 11 and 12, respectively. When the cylinders of the units 16 and 17 are supplied with pressurized hydraulic or other fluid, the pistons are displaced in the cylinder to increase the total length of the power unit as is well known. An increase in the length of the power unit 16 forces the arm 11 to rotate in a clockwise direction around the pin 14 while a similar increase in the length of the power unit 17 forces the arm 12 to rotate in a counterclockwise direction around the pin 15. The units 16 and 17 may be remotely activated to spread the arms 11 and 12 as required for the purpose of placing the apparatus T on the pipeline P or to remove it therefrom.

While the following description relates only to the construction and operation of the arm 11, it should be appreciated that it applies equally to the arm 12 in that the two arms 11 and 12 are similar except that one is the mirror image of the other. At the upper portion of the arm 11, a flexible hose 21 constructed of steel reinforced rubber or of any other suitable material is connected over a rigid spout or hose nipple 22. An elbow 22 is rigidly secured between a plate 22d extending from the lower end of the sprout 22 and a second plate 22e extending from a cylindrical gear housing 23 to form a hinge assembly for the arm 11. The lower end of the housing 23 is rigidly secured to a tubular support 24 which extends into the interior of a cutting cage indicated generally at 25.

Figure 2:
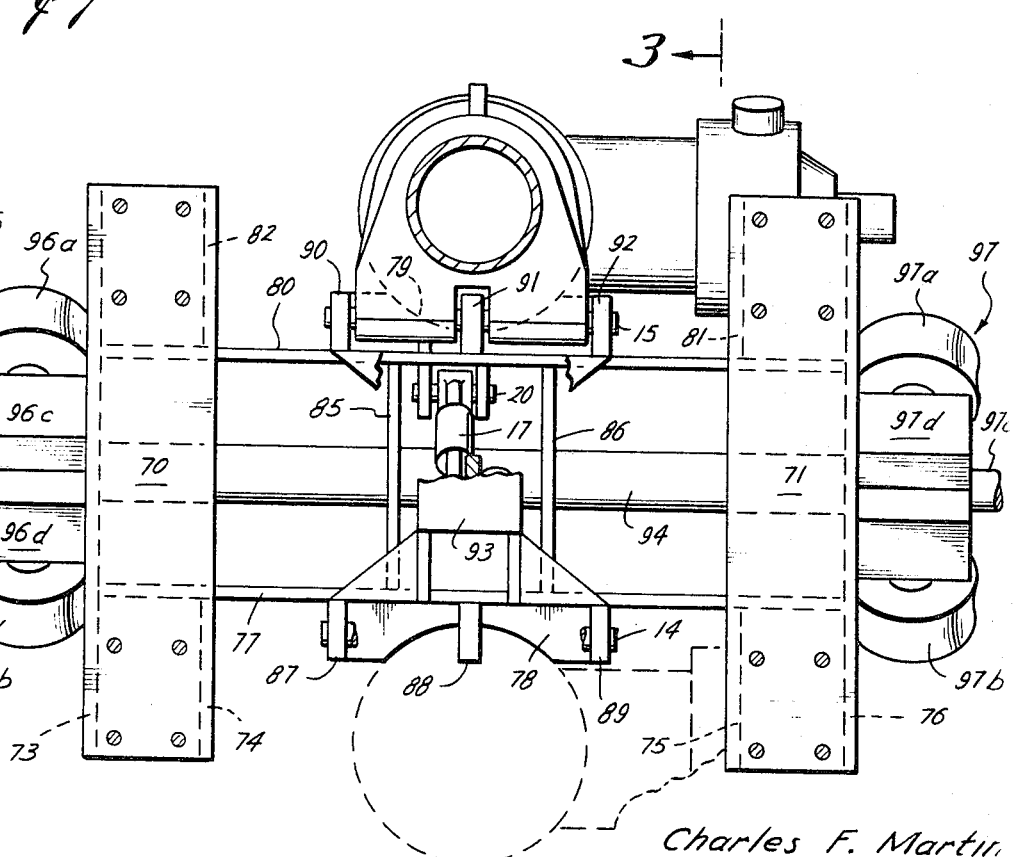
FIG. 2 is a partial sectional view of the apparatus of the present invention taken along the line 2—2 of FIG. 4 with portions of the apparatus broken away for clarity of illustration.

A radial-piston, hydraulic motor 26 mounted on the trailing end of the trencher T extends outwardly from the gear housing 23 as may best be seen by reference to FIGS. 2 and 4 of the drawings. The motor 26 is driven by pressurized hydraulic or other fluid which is circulated through the motor and returned to the pressurizing means in a well-known manner. As best illustrated in FIG. 4 of the drawings, the motor rotates a shaft 27 which extends through a bushing in the housing 23 and drives a tapered pinion gear 28. The gear 28 engages a larger ring gear 29 which is rigidly connected to a vertically extending tubular drive shaft 30. The cone of conventional cup and cone thrust bearing 31 positions and rotatably supports the shaft 31 in the housing 23. A mounting sleeve 33 having a flange 33a is secured about the tubular drive shaft 30 by means of an internally threaded lock ring 34 which engages co-operating threads formed on the lowermost end of the shaft 30. Set screws such as the set screw 35 extend through the ring 34 to prevent it from disengaging the shaft 30. The sleeve 33 is internally grooved and the shaft 30 is provided with co-operating external grooves to receive several keys such as the key 36 which force the sleeve 33 to rotate with the shaft 30.

The lower position of the drive shaft 30 is rotatably centered in the lower end of the support 24 by means of a second conventional cup and cone thrust bearing 37. The bearing 37 is carried in a standoff ring 38 rigidly secured to the interior of the support 24 by welding or other suitable means. The sleeve 33 may be adjusted as desired by means of the lock ring 31 to bear against the cone of the bearing 37 to provide a firm mounting for the lower end of the shaft 30. As will be apparent from the described construction of the trencher T, rotation of the shaft 27 drives the tubular shaft 30 which in turn produces the desired rotation of the cage 25.

The cage 25 is formed with vanes 42 which are welded or otherwise secured to the mounting ring 41. A smaller diameter mounting ring 43 is welded to the lower end of the vanes 42 while a larger diameter ring 44 is welded to the upper end of the vanes 42 which gives the cage 25 a generally conical configuration. The upper portion of the cage 25 is provided with contoured, inwardly curving spokes 45 which are rigidly secured between the ring 44 and a ring 46. The contour of the spokes 45 prevents the cage 25 from striking the pipeline P while the ring 46 maintains the axial alignment of the cage 25 about the tubular support 24. If desired, bearings or other appropriate rolling or sliding means (not illustrated) may be disposed between the ring 46 and the tubular support 24.

In the illustrated embodiment of the trenching machine T of the present invention, six spiraling steel vanes 42 are welded to the rings 41, 43, and 44. The vanes 42 carry steel teeth 50 which dig into the formation of the bed B. The teeth 50 may be welded onto the vanes 42 or they may be removably secured to the vanes for ease of replacement. The teeth 50 on one vane 42 are staggered with respect to the teeth on an adjacent vane. The individual staggered teeth 50 co-operate to form an approximately continuous cutting surface on the cage 25, with succeeding portions of the cutting surface encountering the formation at later times. By preventing the full cutting surface of the cage 25 from coming into contact with the formation simultaneously, chatter and vibration are reduced and more efficient results.

The mounting pitch of the teeth 50 on the vanes 42 may be altered to best cut a particular type of formation. By way of example rather than limitation, it is possible that for any given formation, the cage 25 may cut most effectively when it pulls downwardly into the formation with a corkscrew-like effect as it is rotated. In this event, the slope or pitch of the mounting of the tetth 50 on the vanes 42 is set to achieve the desired effect.

In addition to the teeth 50 projecting from the vanes 42, teeth 51 are affixed to the bottom of the ring 43. The teeth 51 tend to pull the cage 25 down into the formation and assist in cutting a relatively flat bottom trench.

With reference to FIG. 4 of the drawings, a dredge tube 52 for removing the cuttings formed by the cage 25 extends through the center of the tubular drive shaft 30. The upper end of the tube 52 opens into the elbow 22 where it is welded or otherwise secured to the housing 23. The lowered end of the tube 52 projects from the bottom of the tubular shaft 30 where it serves as an intake for the removal of cuttings broken away from the formation by the rotating cutter cages. The tube 52 also acts as a means for mounting a bearing 53 which encircles and supports the drive shaft 27 extending from the motor 26.

The bearings 53, 31, and 37 and the contents of the gear housing 23 are protected from damaging debris and other undesirable external matter by means of appropriate seals 54 and 55. The seal 55 forms a wiping seal between the rotating shaft 30 and the support 24 while the seal 54 forms a wiping seal between the tube 52 and the rotating shaft 30.

Figure 3:
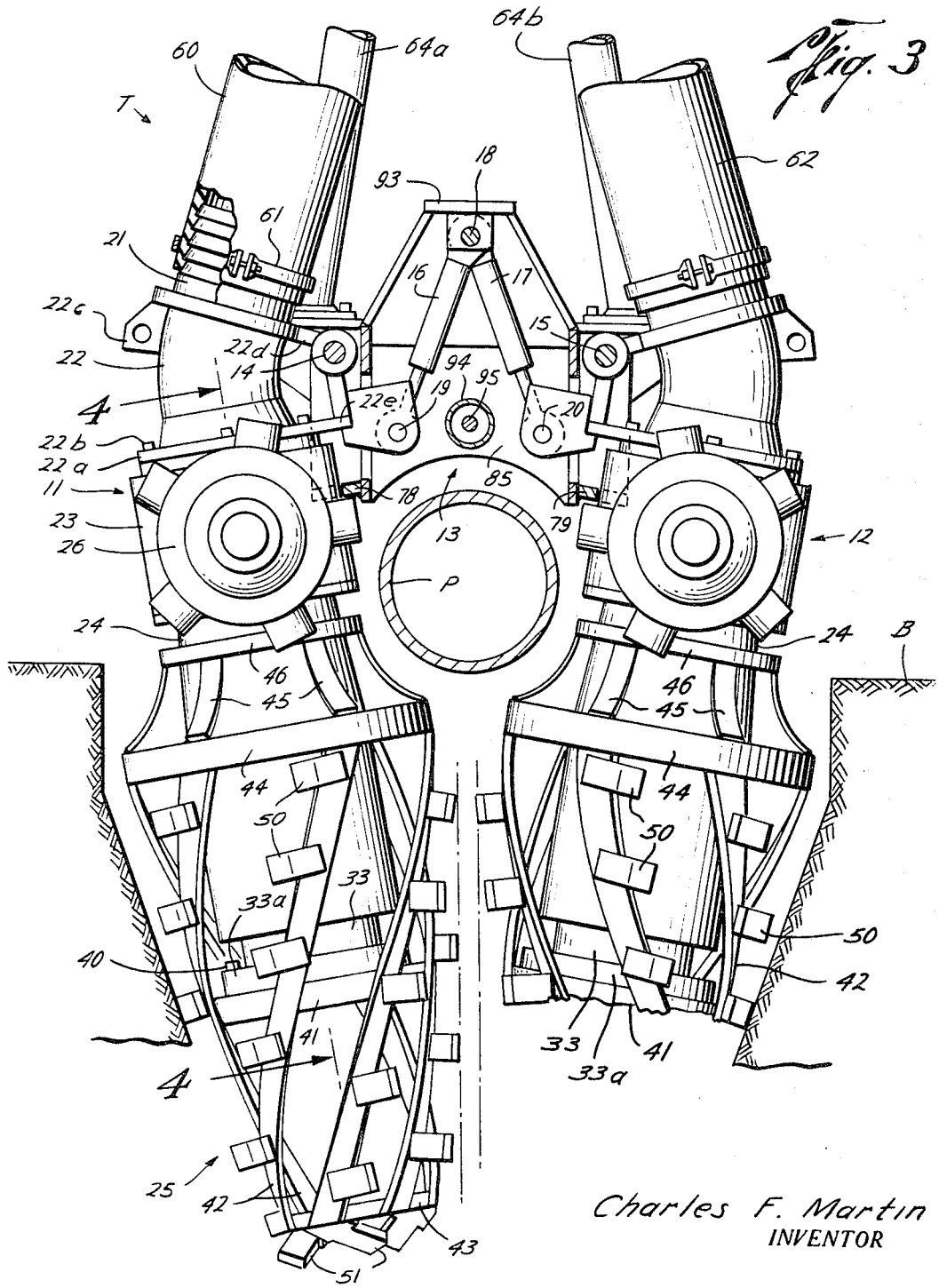
FIG. 3, taken approximately along the line 3—3 of FIG. 2, is a partial cross-section of the apparatus of the present invention with some portions of the apparatus broken away and others added for clarity of description.

As best illustrated in FIG. 3 of the drawings, a flexible rubber steel-reinforced hose 60 is secured over the end of the nipple 21 by means of a metal clamp 61. A second hose 62 is clamped to the arm 12 in a similar manner. With reference to FIG. 4 of the drawings, the hoses 60 and 62 extend from the arms 11 and 12 to an overhead support plate 62 which forms a part of a mast assembly indicated generally at 64. The upper ends of the hoses 60 and 62 are clamped over the nipples 64d and 64e, respectively, which in turn are bolted to the plate 63. Similar nipples 66 and 67, bolted to the top of the plate 63, are connected to hoses (not specifically illustrated) in the line L which conduct the cuttings away from the cutting cages. The cuttings may thereafter be disposed of as desired. By way of example rather than limitation, the hoses in the line L may be drawn through a dredge pump (not illustrated) on the surface vessel V and conducted through another hose (not illustrated) which deposits them at a distance behind the trencher T to fill in the trench and cover the pipeline P.

As best illustrated by reference to FIGS. 3 and 4, the mast assembly includes four tubular supports such as the pair of members 64a, 64b, and another pair of such members, one of which is shown and designated 64c. Each pair is welded together to form two A-frames. The A-frames are bolted or otherwise secured to plates 70 and 71 of the framework 13. Two eye plates 63a and 63b are welded to the support plate 63 to provide a means for securing a cable, such as the cable C, to the trencher T. The mast rod R illustrated in FIG. 1 of the drawings may be secured to the mast assembly 64 by any suitable means.

As best illustrated in FIGS. 2 and 4 of the drawings, the plates 70 and 71 are welded or otherwise suitably secured to a supporting structure consisting primarily of two transversely extending plates 73 and 76 welded to two longitudinally extending plates 77 and 80. Triangularly shaped gussets 74, 75, 81, and 82 are preferably welded onto the longitudinal plates 77 and 80 to form a footing for the support plates 70 and 71. The center of the framework 13 includes two spaced, transversely extending plates 85 and 86 which are welded between the longitudinal plates 80 and 77. The plates 85 and 86 are contoured along their bottom edge to prevent them from contacting the pipeline P.

With reference to FIG. 2 of the drawings, two contoured plates 78 and 79 extend from the sides of the longitudinal plates 77 and 80, respectively, to act as stops for the pivotal movement of the arms 11 and 12.

The hinge pin 14 extends through eyes formed in the plates 87, 88, and 89 which are also welded to the side of the support plate 77 while similar plates 90, 91, and 92 welded to the side of the plate 80 support the hinge pin 15.

As best illustrated in FIG. 3 of the drawings, a small riser structure extends upwardly from the framework 13 where it supports a horizontal support plate 93. The plate 93 in turn supports the clevis through which the pin 18 extends.

A tubular shaft housing 94 extends longitudinally through the framework 13 from the plate 76 to the plate 73. A drive shaft 94, illustrated in FIG. 3 of the drawings, extends through the tubular housing 94 to connect the front and rear drive assemblies which are indicated generally at 96 and 97, respectively. The assemblies 96 and 97 are employed to advance the trencher T along the pipeline P as the trench is being cut through the formation of the bed B. The drive assemblies 96 and 97, which are described in greater detail in the aforesaid copending application Ser. No. 625,201, comprise suitable wheels such as the wheels 96a, 96b, 97a, and 97b. Each set of wheels is powered by a suitable motor connected to each of the shafts 96c and 97c which in turn drive appropriate gears contained in the housings 96d and 97d, respectively. The drive shaft 96 acts as a common linkage between the two drive assemblies 96 and 97 to assure the desired movement of all of the wheels along the pipeline P.

*Operation of the preferred embodiment*

The trencher T of the present invention is placed over the pipeline P by first supplying fluid to the power units 16 and 17 to spread the legs 11 and 12. Depending on the particular application, it may be necessary to excavate a suitable pit to allow the arms 11 and 12 to be lowered around the pipeline P. The raising and lowering of the trencher T may be accomplished by appropriate movement of the cable C. When the wheels 96a, 96b, 97a, and 97b of the trencher T engage the pipeline P, the pressure of the fluid supplied to the units 16 and 17 may be decreased to permit the two arms 11 and 12 to close back together around the pipeline P.

The hydraulic motors 26 are then activated to initiate rotation of both of the cutting cages 25. The two cages rotate in opposite directions to maintain the vertical position of the trencher T which prevents any tendency of the trencher to twist around the pipeline P as a result of the rotation of the cages 25. Moreover, the movement and arrangement of the teeth 50 and the vanes 42 obviates the need to clamp the trencher T on the pipeline P. It should be noted that the cages are slightly spaced from each other at the center of the trench and the external surfaces are parallel to each other at the mid-point below the pipeline (dash-dot lines in FIG. 3) so that no central uncut area or ridge will actually remain in the trench. The teeth 50 on the two cages rotate close enough to each other to accomplish the complete cutting of the central area of the trench, and in practice, the space between the teeth 50 on the cages 11 and 12 may be even less than that illustrated in FIG. 3.

A suitable dredge pump in the vessel V is activated to begin removing the cuttings broken away by the cutter teeth 50. The motors connected to the drive assemblies 96 and 97 are then activated to advance the trencher T along the pipeline P. The surface vessel V closely follows the movement of the trencher T so as to prevent any rupture of the lines L. As the trencher T advances, the pipeline P falls into the relatively flat bottomed trench which is formed by the trencher T. As is apparent from the conical shape of the cutting cages, the sides of the trench slope inwardly to reduce the amount of covering in weaker formations.

When it is desired to remove the trencher T, the power units 16 and 17 are again elongated to swing the arms 11 and 12 open. The trencher T may then be lifted off the pipeline by pulling the cable C. If desired, cables may be hooked onto the ears on the arms 11 and 12, such as the ear 22c, which will spread the legs as the cable is raised.

It should be apparent that while a specific preferred embodiment of the present invention has been described, various modifications may be made without departing from the spirit or scope of the invention.

I claim:
1. A submarine pipeline trenching apparatus comprising:
   (a) a framework;
   (b) a pair of substantially vertically disposed cutting cages depending from said framework and adapted to be disposed below a pipeline for cutting a trench below a pipeline and in a submarine formation;
   (c) rotating means for rotating each of said cutting cages about a substantially vertical axis;
   (d) advancing means for advancing said cutting cages and said framework along said pipeline; and
   (e) removing means for removing the cuttings broken away by said cutting cages.
2. The apparatus of claim 1, wherein:
   (a) each of said cutter cages includes spirally disposed vanes having cutting teeth attached thereto; and
   (b) said rotating means includes means for rotating each of said cages in opposite directions.
3. The apparatus of claim 1, wherein:
   (a) each of said cages has a generally tapered external configuration; and
   (b) the external surfaces of said cages are generally parallel to each other at approximately the mid-point below the pipeline when the cages are in cutting position.
4. The apparatus of claim 1, wherein:
   (a) each of said cages has a generally tapered external configuration;
   (b) the external surfaces of said cages are generally parallel to each other at approximately the mid-point below the pipeline when the cages are in cutting position; and
   (c) teeth on the cages are disposed to cut the entire formation between the cages so as to form a single trench with substantially no uncut central portion therebetween.
5. The apparatus of claim 1, wherein:
   (a) each of said cutting cages is carried on an arm having a pivotal connection to said framework for pivoting said arms and said cages relative to said framework for facilitating the positioning of the cages below a pipeline.
6. The apparatus of claim 5, including:
   (a) a flexible joint in said removing means for accommodating the pivotal movement of said arms.
7. The apparatus of claim 5, wherein:
   (a) said cutter cages include substantially vertical vanes having teeth attached to said vanes; and
   (b) said rotating means includes means for rotating each of said cages in opposite directions.
8. The apparatus of claim 1, wherein:
   (a) said removing means includes a tube in each of said cages having an inlet end opening within the cutting cage and an outlet end near the upper end of the cutting cage; and
   (b) flexible hose means included in said removing means and extending between said framework and said outlet end of each of said tubes for flexing dur- ing the pivotal movement of said arms while also serving as a conduit for conducting the cuttings away from said cages.

9. The apparatus of claim 8, wherein:
(a) said cutter cages include substantially vertical vanes having teeth attached to said vanes; and
(b) said rotating means includes means for rotating each of said cages in opposite directions.

10. The apparatus of claim 9, including:
(a) a flexible joint in said removing means for accommodating the pivotal movement of said arms.

References Cited

UNITED STATES PATENTS

| | | | |
|---|---|---|---|
| 2,417,313 | 3/1947 | MacKinnon | 61—72.6 X |
| 2,755,632 | 7/1956 | Hauber et al. | 61—72.4 |
| 3,004,392 | 10/1961 | Symmank | 61—72.4 |
| 3,103,790 | 9/1963 | Popich | 61—72.4 |
| 3,238,734 | 3/1966 | Rhodes | 61—72.4 |
| 3,368,358 | 2/1968 | Elliott | 61—72.4 |

EARL J. WITMER, *Primary Examiner.*